F G. CHESMAN.
Improvement in Scalding Apparatus.
No. 127,679. 　　　　　　　　　　Patented June 11, 1872.
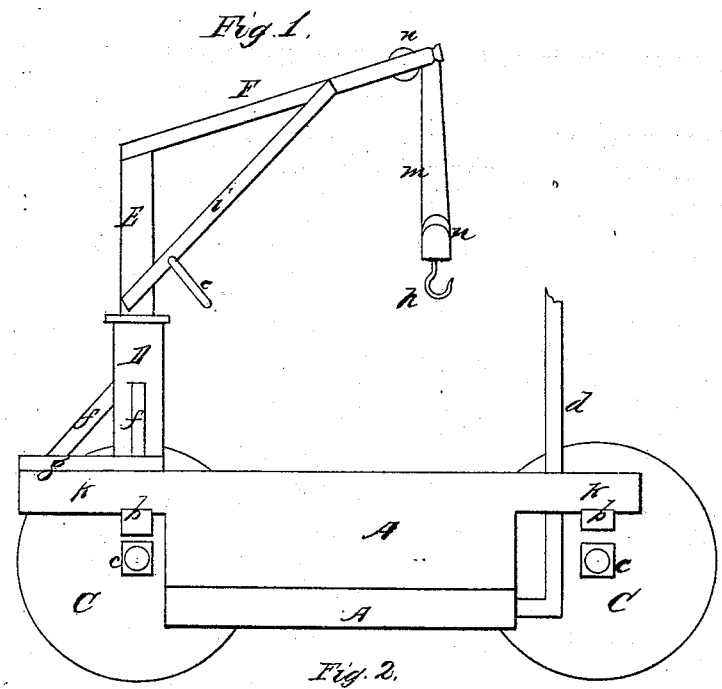
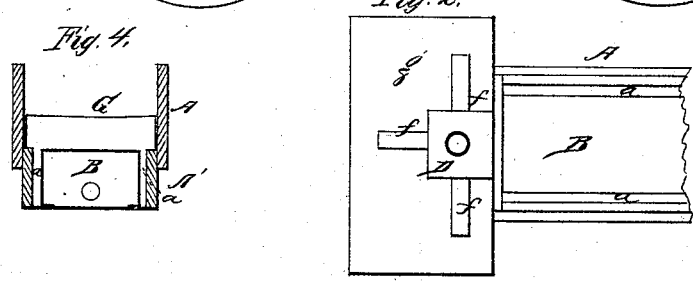
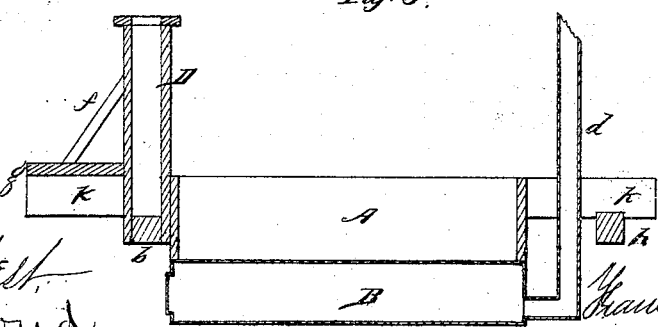
Witnesses.　　　　　　　　　　　　　　Inventor:

No. 127,679

UNITED STATES PATENT OFFICE.

FRANCIS G. CHESMAN, OF DU PAGE, ILLINOIS.

IMPROVEMENT IN SCALDING APPARATUS.

Specification forming part of Letters Patent No. 127,679, dated June 11, 1872.

SPECIFICATION.

I, FRANCIS G. CHESMAN, of the town of Du Page, in the county of Will and State of Illinois, have invented certain new and useful Improvements in Scalding Apparatus, of which the following is a full description, reference being had to the accompanying drawing making a part of this specification, in which—

Figure 1 is a side elevation, two wheels being removed; Fig. 2, a plan view of the platform; Fig. 3, a longitudinal vertical section; Fig. 4, a transverse vertical section.

The chief object of my invention is to construct a combined tank, fire-box, and derrick, to be used for slaughtering hogs.

In the drawing, A A' represent the tank, about five and a half feet long, two feet wide, and two feet or more deep. The sides may be made of two pieces of plank, as represented in Fig. 4, with a bottom of metal; and in this tank is a fire-box, B, the bottom of the tank being, as shown, the bottom of the fire-box. This fire-box extends the whole length of the tank, but is somewhat narrower than the tank, leaving water-spaces $a$ $a$ at the sides. At one end of the fire-box is a door, and at the other end a pipe, $d$, for the passage of the smoke. $k$ $k$ are arms extending from the tank, and resting upon pieces of timber $b$ $b$, which take the place of the bolsters in an ordinary wagon. $g$ is a platform at the rear end of the tank; D, a hollow standard, in which the post E is inserted and revolves. At the top of this post E is secured an arm, F, of suitable length, supported by braces $i$; $e$, crank of a windlass; $h$, hook; $m$, rope; $n$ $n$, pulleys; $f$ $f$, braces for the standard D.

The tank, fire-box, and surmounted derrick are so made that they can be easily placed upon the axles of an ordinary wagon.

Slaughtering hogs in the country is attended with a great amount of labor, much of which can be saved by the use of this apparatus.

The water in the tank, by means of the fire in the fire-box B, can be kept at the proper temperature by a small fire. The hog to be dressed can be lifted into the tank by means of the derrick and removed therefrom. The platform $g$ furnishes the standing-place for the men operating the derrick.

This apparatus can be moved from place to place, as occasion may require, and when not in use for slaughtering purposes, the tank and fire-box can be removed from the wheels and used for many useful purposes.

This device will be found especially useful in a farming community where slaughtering conveniences are not found.

I do not limit myself to the exact form of derrick shown, the gist of my invention being in combining a scalding-tank, a fire-box, and a derrick, substantially as specified.

In cases where the owner of the apparatus does not desire to transport it from place to place, the arms $k$ can be omitted and a framework for the support of the derrick can be connected with the tank at the side thereof, instead of at the end, if desired.

What I claim as new is as follows:

1. The combination of the water-tank A, fire-box B, and derrick D E F, substantially as and for the purpose set forth.

2. The combination of the water tank A, fire-box B, having water-spaces $a$ $a$ between its sides and the sides of the tank, with a derrick, D E F, the whole being mounted on wheels for transportation, substantially as and for the purposes set forth.

FRANCIS G. CHESMAN.

Witnesses:
E. A. WEST,
O. W. BOND.